United States Patent
Kaltsukis

(10) Patent No.: US 7,937,066 B2
(45) Date of Patent: May 3, 2011

(54) EMERGENCY CONFERENCE CALLING SYSTEM

(75) Inventor: Calvin Lee Kaltsukis, San Rafael, CA (US)

(73) Assignee: 911Tracker, Inc., San Jose, CA (US)

( * ) Notice: Subject to any disclaimer, the term of this patent is extended or adjusted under 35 U.S.C. 154(b) by 0 days.

(21) Appl. No.: 11/013,060

(22) Filed: Dec. 14, 2004

(65) Prior Publication Data
US 2005/0136885 A1 Jun. 23, 2005

Related U.S. Application Data

(60) Provisional application No. 60/532,449, filed on Dec. 22, 2003.

(51) Int. Cl.
*H04M 11/02* (2006.01)

(52) U.S. Cl. ............... 455/404.1; 379/45; 455/404.2; 455/416

(58) Field of Classification Search ........... 455/404.1, 455/416, 404.2; 379/45
See application file for complete search history.

(56) References Cited

U.S. PATENT DOCUMENTS

| | | | |
|---|---|---|---|
| 5,815,550 A | | 9/1998 | Miller |
| 5,896,565 A | | 4/1999 | Miller |
| 6,014,555 A | * | 1/2000 | Tendler .................. 455/404.1 |
| 6,028,537 A | * | 2/2000 | Suman et al. ................ 340/988 |
| 6,052,574 A | * | 4/2000 | Smith, Jr. .................. 455/404.2 |
| 6,154,658 A | * | 11/2000 | Caci ............................ 455/466 |
| 6,292,542 B1 | | 9/2001 | Bilder |
| 6,340,928 B1 | * | 1/2002 | McCurdy .................... 340/436 |
| 6,366,646 B1 | | 4/2002 | Miller |
| 6,430,174 B1 | * | 8/2002 | Jennings et al. ............. 370/352 |
| 6,449,472 B1 | * | 9/2002 | Dixit et al. ................ 455/404.1 |
| 6,807,564 B1 | * | 10/2004 | Zellner et al. ................ 709/206 |
| 2002/0032048 A1 | * | 3/2002 | Kitao et al. .................... 455/569 |
| 2003/0050039 A1 | * | 3/2003 | Baba et al. .................... 455/404 |
| 2004/0105529 A1 | * | 6/2004 | Salvucci et al. ................ 379/45 |
| 2004/0198435 A1 | * | 10/2004 | Gauld et al. ............... 455/556.1 |
| 2005/0111630 A1 | * | 5/2005 | Potorny et al. .................. 379/45 |

* cited by examiner

Primary Examiner — Charles Shedrick
(74) Attorney, Agent, or Firm — Norman E. Lehrer

(57) ABSTRACT

An apparatus for the location of an object of value, such as a vehicle, includes a cell phone disposed in the vehicle and under microprocessor control. The cell phone is adapted to call an owner on detection of an alarm condition as well as to place a call to 911. The cell phone, according to a preferred embodiment, places the call to 911 under command by the owner and then establishes a three-way conference call between the owner and a 911 dispatcher who answers the 911 call. Other methods of creating the conference call and of using the apparatus are disclosed including call transfer and call relay modes of operation. Other features, including GPS coordinate acquisition and transmission, are described.

19 Claims, 6 Drawing Sheets

EMERGENCY CONFERENCE CALLING SYSTEM

This application claims benefit of priority of provisional patent application No. 60/532,449 filed Dec. 22, 2003.

BACKGROUND OF THE INVENTION

1. Field of the Invention

The present invention, in general relates to alarms and security systems and, more particularly, to a "911" emergency call and location device.

Cellular telephones (i.e., cell phones) are well known devices. The use of 911 to place an emergency call is also well known for both cell phones and also for "land lines".

Every cellular service provider is required to provide capability of locating the geographical position of the calling device to within 100 feet for every cellular call that is placed to 911. Many methods and concepts for locating the position are possible and are not related to the novelty of the instant invention.

Alarm systems for vehicles are also well known devices. All too often false alarms are generated at considerable expense to both vehicle owner and emergency service providers, such as the law enforcement department of the community.

Home alarm systems that auto dial either an owner or place a call automatically upon detection of an event, such as an intrusion are also known types of devices. As mentioned above, frequent false alarms have caused many law enforcement departments to cease to respond to these types of calls that are machine generated.

That is one reason why alarm system companies that monitor home alarm systems and, upon detection of an intrusion, place a call to the police are increasingly popular. The police must respond to an in-person call that is an appeal for help. The company is responsible to make the determination as to whether the "alarm indication" is real or false. However, if they make the determination that it is real and call for help, their call must be responded to.

It is anticipated that similar, auto dialing vehicle systems that are based on 911 calling will be developed that will aid in tracking a lost or stolen vehicle. However, it is believed that false alarms will similarly cause law enforcement departments to cease responding to these types of calls or to levy huge financial penalties to the vehicle owners due to false alarms. While it is possible that the alarm system companies may expand their services to include cellular phone systems, this is yet to occur. Even if it did occur, there is likely no way to effectively screen out false alarms from true crisis situations.

It is desirable to utilize the improving geographical location abilities of 911 cellular calling to locate a lost or stolen vehicle and to eliminate the possibility of false alarms. This capability is desirable for use with any object that is mobile, including but not limited to automobiles, motorcycles, trucks, commercial vehicles, airplanes, boats, RVs, and other valuable items.

There are many types of cellular phone systems that stand to benefit from improvement in this regard. In addition to a pure cellular phone system (i.e., one with a plurality of cell sites distributed on land), satellite phone call connection is another option for mobile communication as is Voice over Internet Protocol (VoIP).

The FCC has ruled that emergency calls to 911 placed either over satellite or VoIP must conform to the same rules as landline and cellular sites and that they also are required to contain location information in all emergency 911 calls. Accordingly, the instant invention applies equally to satellite phone call connections as well as VoIP connections.

Accordingly, there exists today a need for a method and system for an emergency conference calling system that helps ameliorate the above-mentioned difficulties while also providing other substantial benefits and improvements to vehicle security.

Clearly, such a system would be useful and desirable.

2. Description of Prior Art

Mobile alarm systems are, in general, known. For example, the following patents describe various types of these devices:

U.S. Pat. No. 6,532,360 to Shaffer, Mar. 11, 2003;
U.S. Pat. No. 6,184,801 to Janky, Feb. 6, 2001;
U.S. Pat. No. 6,148,212 to Park et al., Nov. 14, 200;
U.S. Pat. No. 6,002,326 to Turner, Dec. 14, 1999;
U.S. Pat. No. 5,918,180 to Dimino, Jun. 29, 1999;
U.S. Pat. No. 5,895,436 to Savoie et al., Apr. 20, 1999;
U.S. Pat. No. 5,515,043 to Berard et al., May 7, 1996;
U.S. Pat. No. 5,276,728 to Pagliaroli et al., Jan. 4, 1994; and
U.S. Pat. No. 4,821,309 to Namekawa, Apr. 11, 1989.

While the structural arrangements of the above described devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide an emergency conference calling system that helps prevent false alarms.

It is also an important object of the invention to provide an emergency conference calling system that includes a cell phone or a cell phone to satellite connection or a VoIP (Voice over Internet Protocol) connection that is adapted to call 911 when instructed to do so.

Another object of the invention is to provide an emergency conference calling system that is adapted to place a cellular telephone call to an owner of a vehicle upon detection of an event.

Still another object of the invention is to provide an emergency conference calling system that is adapted to answer a call from an owner, input commands from the owner, and subsequent to receipt of a particular command, to establish a conference call via the owner and a 911 dispatcher.

Still yet another object of the invention is to provide an emergency conference calling system that stores data in a memory on how a vehicle is operated, i.e., miles driven, vehicle location, driving habits, speed, hours of operation, and which allows access to and downloading of the stored data.

Yet another important object of the invention is to provide an emergency conference calling system that is adapted to automatically place a call to 911 in the event of a collision sufficient to jettison the air bags and to automatically provide 911 with an explanation for the call.

Still yet another important object of the invention is to provide an emergency conference calling system that is adapted to detect excessive speed or acceleration and notify the owner.

A first continuing object of the invention is to provide an emergency conference calling system that is adapted to allow valet parking of a vehicle without generating an alarm condition unless another event were to occur.

A second continuing object of the invention is to provide an emergency conference calling system that is adapted to answer a call from an owner, input commands from the owner, and subsequent to receipt of a particular command, to put the owner on hold (if necessary), place a cellular call to 911, and after answering by a 911 dispatcher, add the owner to the call (if the owner was placed on hold), thereby establishing a conference call between the cellular telephone of the emergency conference calling system, the owner, and the 911 dispatcher.

A third continuing object of the invention is to provide an emergency conference calling system that is adapted to minimize actual air-time minutes of a built-in cell phone.

A fourth continuing object of the invention is to provide an emergency conference calling system that is adapted to minimize actual air-time minutes of a built-in cell phone and which is adapted to encourage cell phone service providers to offer a lower rate structure for built-in cell phones that are adapted for use only with alarm system applications.

Briefly, an emergency conference calling system that is constructed in accordance with the principles of the present invention is hidden in a vehicle and has a microprocessor (or microcontroller) programmed as a digital number dialer that calls the owner, via a built-in cellular telephone, when one of its alarm inputs is triggered. The microprocessor or microcontroller is either a separate component or is included as an integral part of the cellular telephone. The cellular telephone is programmed to answer only pre-programmed numbers that attempt to call it and to disregard all other calls it may receive. The built-in cellular phone makes no sound upon receipt of any incoming call. The vehicle phone number is preferably linked to a message instead of a name so the owner will see, for example, a message on their own phone (likely, also a cellular phone) "Auto Alarm Sounding" and preferably set to cause the owner's phone to respond in a unique manner, for example at a preferable warble tone (as set by the receiving phone when receiving a call with caller ID from the emergency conference calling system) and where the owner does not allow the incoming call to go to voice mail. Other methods of contacting the owner, for example by SMS, MMS, email, are also programmed into the microprocessor or microcontroller (or other type of programmable processor) as backup contact options. Once notified, the owner hangs up and calls the built in cellular phone of the emergency conference calling system and then keys in a pin number that instructs the cellular telephone of the emergency conference calling system to put the owner on hold (as may be required) and to then place a "911" emergency call. Upon answering of the 911 call, the owner is then also added to the connection as a three-way conference call between a 911 dispatcher and the built-in cellular phone, which makes no audible sound. The owner is now able to explain the reasons for the call, which from a 911 perspective, appears to originate from the built-in cellular phone of the emergency conference calling system of the vehicle. The applicable cellular 911 location technology is then employed to locate and recover the vehicle. Many other capabilities are also possible. For example, the owner can effect an engine shutdown which the microprocessor (or microcontroller) interprets as an "engine-off" command to disable operation of the engine. This can make recovery easier. A Bluetooth camera can be added for acquisition of a photograph or video stream which is sent to the owner's phone or email, as can GEO Fencing by which GPS coordinates are logged. The photograph or video stream is also adapted to be transmitted to 911 in the event of a collision, in which a 911 dispatcher would see either a photograph or real time video stream to determine the extent of the injuries. If the GPS coordinates change while the emergency conference calling system is activated and if the vehicle is not running, a conclusion that the vehicle is almost certainly being towed is reached. The owner is notified with a corresponding indicative message. There are also other modes by which the emergency conference calling system can be activated. For example, the police can call the cellular telephone of the emergency conference calling system (from 911) and it can be programmed to answer and respond to their commands. The owner can instruct the emergency conference calling system to place two cellular calls, one to 911 and another call to the owner, thereby again establishing three-way conference call capability. If desired, the owner can also instruct the emergency conference calling system to place a cellular call to 911 in a normal two-party mode, providing the owner is also in simultaneous 911 communication, for example by a separate telephone line.

DETAILED DESCRIPTION OF THE INVENTION

Figure 1B:
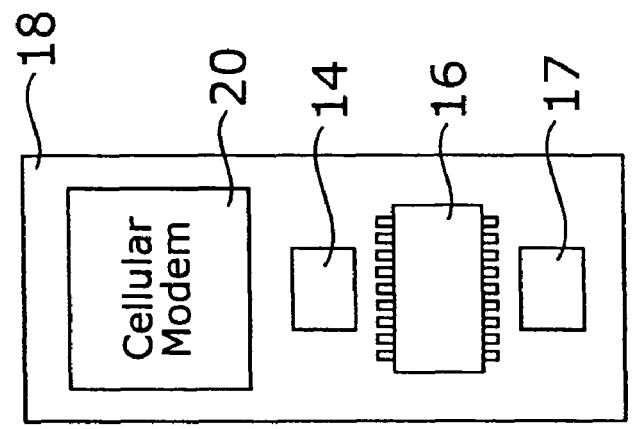
FIGS. 1A, 1B, 1C, and 1D are plan views of various embodiments of an emergency conference calling system.

Referring to all of the drawings on occasion and now in particular to FIG. 1A to FIG. 1D is shown, an emergency conference calling system, identified in general by the reference numeral 10. The system 10 is adapted for installation and use in any vehicle, truck, airplane, boat, RV, motorcycle, or any other mobile object that is deemed to be of sufficient value to warrant inclusion of the system 10. Hereinafter, the term "vehicle" is used to include any possible application of the system 10.

There are many ways to implement the emergency conference calling system 10, a few of which are shown herein.

Figure 1A:
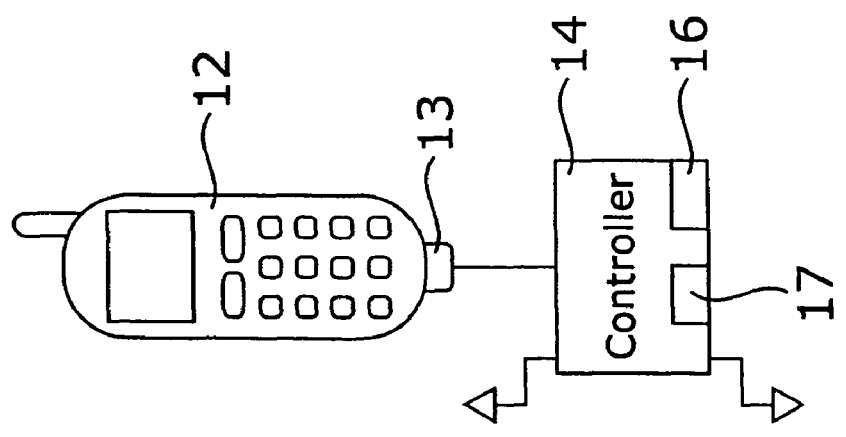

In particular, FIG. 1A includes a conventional type of a cell phone 12 that is connected by a UART connector 13 (universal asynchronous receiver transmitter) to a controller 14. The controller 14 includes a microprocessor 16 and memory 17. This configuration allows use of the UART connector 13, or other type of port as may be included with the conventional types of the cell phone 12, with the system 10.

Operation of the controller 14 is described in detail hereinafter whenever system 10 operation is described.

Alternately, FIG. 1B includes a printed circuit board 18 that includes all component parts of the controller 14 including the microprocessor 16 and the memory 17. A built-in cellular modem 20 functions as a built-in equivalent version of the cell-phone 12. This configuration allows for customized design and increased functionality of the emergency conference calling system 10.

Figure 1D:
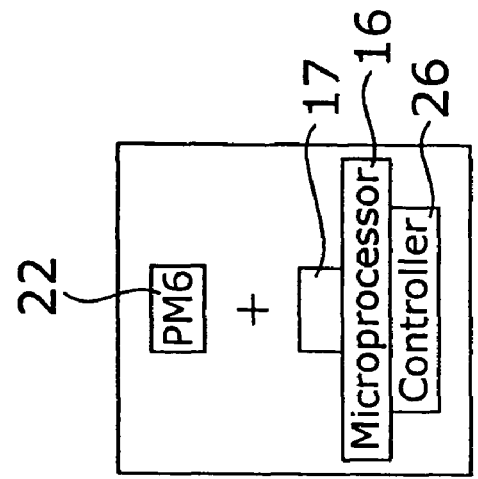
Figure 1C:
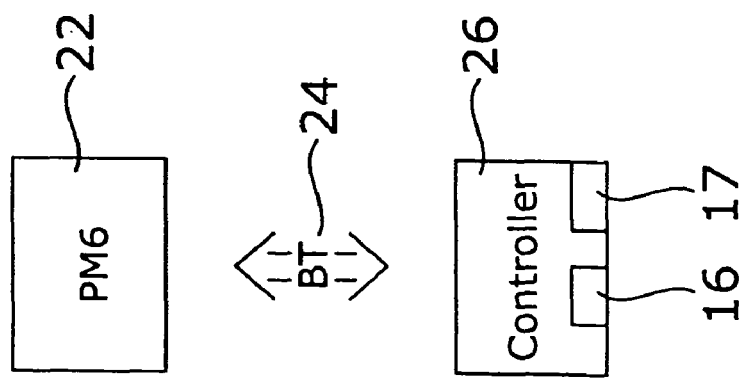

Referring now to FIG. 1C, a modified type of a cellular modem 22, for example of the type produced by IXI Corporation for use as a Personal Mobile Gateway (PMG) is shown adapted for a Bluetooth type of wireless connection 24 to a wireless type of controller 26.

Accordingly, an ability to remotely locate the wireless type of controller 26 at a convenient and remote location with respect to the modified cellular modem 22 is provided as well as ability to incorporate other Bluetooth type of devices, for example, a Bluetooth camera that is disposed where desired in the vehicle.

FIG. 1D includes the components of FIG. 1C and all necessary components as a single integral unit.

Figure 2:
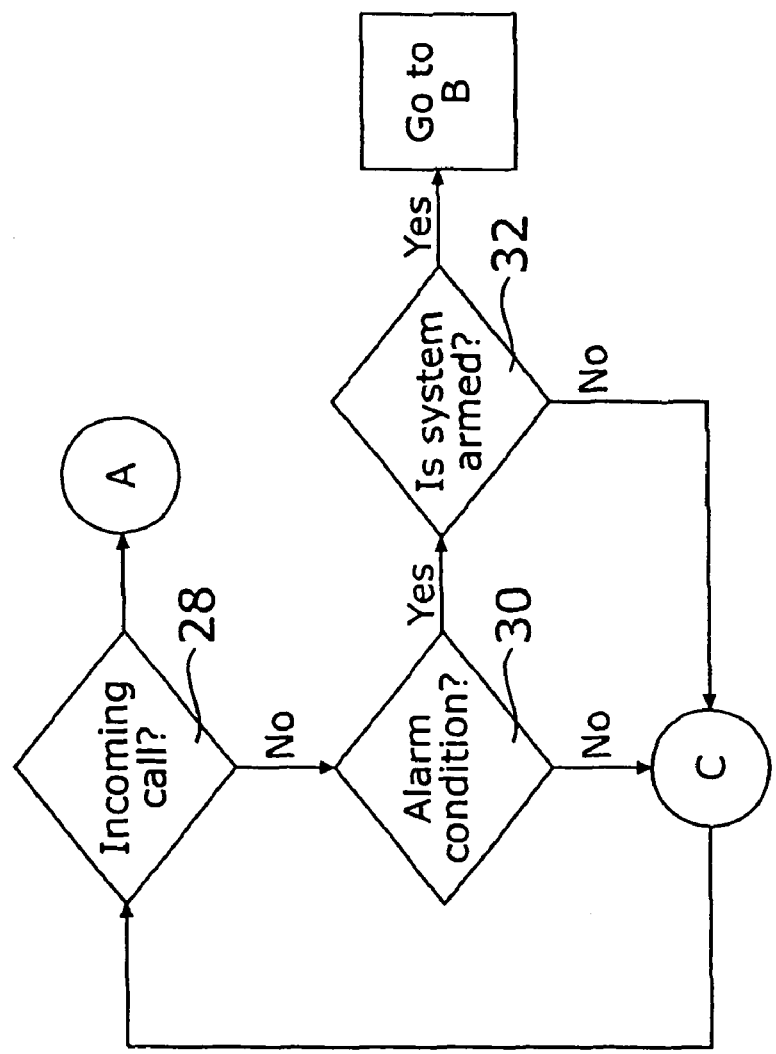
FIG. 2 is a high-level flow chart of the emergency conference calling system of FIG. 1A-1D in a quiescent loop.

Referring now, primarily to FIG. 2, is shown a high level executive flow chart of operation of the system 10 in a quiescent state.

In any preferred order, the system 10 makes determination of receipt of an incoming call 28 that is being received by the cell phone 12 or cellular modem 22 or modified cellular modem 22. Hereinafter, when the term "cell phone 12" is referenced, it is intended to include any variation thereof.

When the incoming call 28 is detected, operation of the system 10 (i.e., the microprocessor 16) continues at "A" in FIG. 4, as is described in greater detail hereinafter.

When the term microprocessor 16 is used herein, it is intended to include any programmable device. Microcontrollers or radio chipsets (now or of future design) are intended to be included when the general term, microprocessor 16, is used. It will be a matter of design prerogative, after having benefited from the instant disclosure, to either include the microprocessor 16 as a separate component or to use it or any similar device (i.e., microcontroller, radio chipset, software configurable processor, software-defined radio (SDR), RISC, Field-Programmable Gate Array (FPGA), digital signal processor (DSP), etc.) that may be included in either the cell phone 12 or in or as part of any other component part of the system 10 to perform the functions as are described herein. For example, handset design companies are working on software configurable processors to be included in the chipset as well as small single chip computers that are adapted to run special communications oriented programs as well as able to perform a variety of programmable functions.

The system 10 also monitors any of as many possible sensors to detect an alarm condition 30 as is desired and, subsequent to a detection of the alarm condition 30, a determination as to whether the system is armed 32 is made. If the system is not armed, that is if an owner is using the vehicle and wants to disable the system 10 during such use, the system 10 returns to its quiescent loop.

Figure 3:
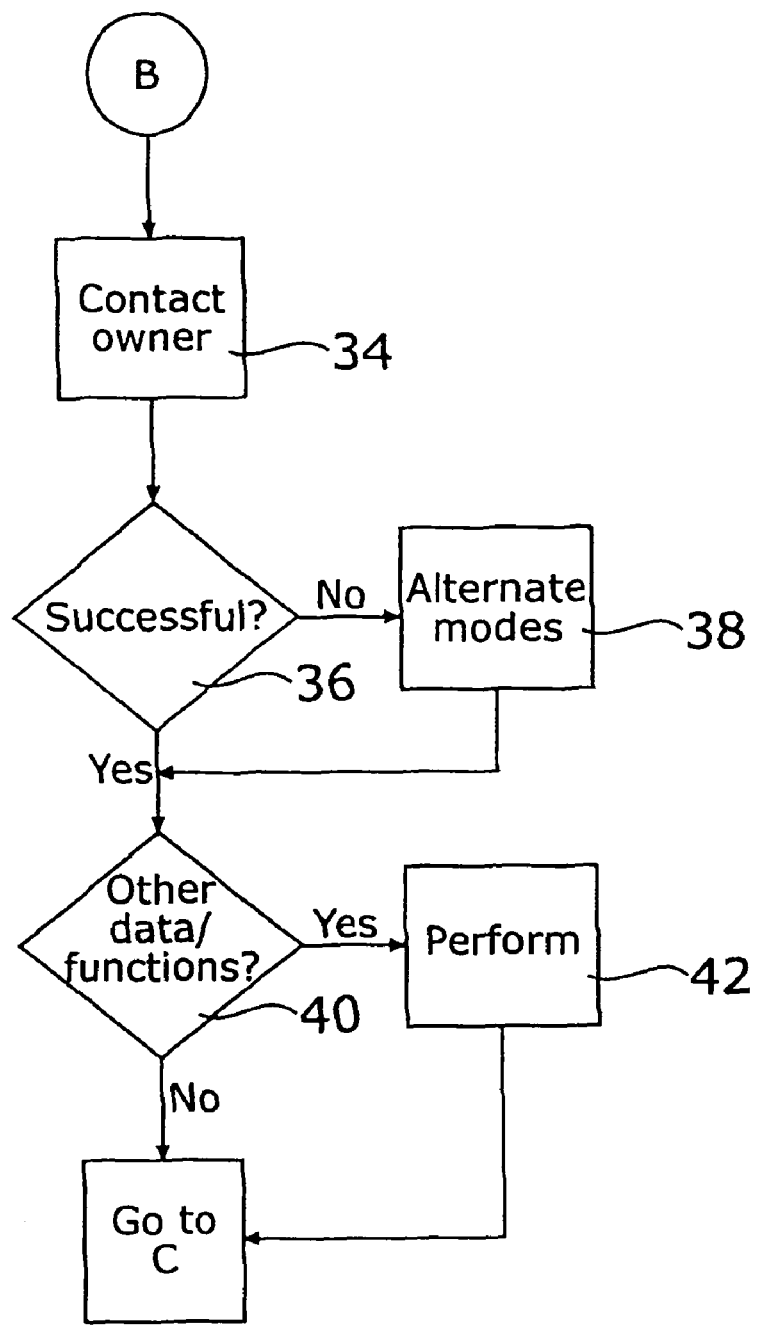
FIG. 3 is a high-level flow chart of the emergency conference calling system of FIG. 1A-1D after detection of an alarm condition of FIG. 2.

However, if the system 10 is armed (i.e., active) and the alarm condition 30 is detected, then program operation is transferred to "B" in FIG. 3. This described in greater detail hereinafter.

Just a few possible sensors that are used to generate the alarm condition include any method of detecting intrusion into the vehicle, motion by the vehicle, variation of GPS (global positioning system coordinates) of the vehicle beyond a predetermined or programmable limit that is stored in the memory 17, breakage of glass, infrared sensor, or any other desired sensor, etc.

Additional inputs and devices are included with the system 10, as desired. For example, if GPS coordinates are used, a GPS type of a device is also included, either as a built-in component or as a remotely located peripheral device that periodically obtains current GPS coordinates and then communicates the current coordinates to the controller 14, either by hard wire (as shown by reference numeral 13) or by wireless connection (as shown by reference numeral 24).

As a possible example of a condition capable of generating a positive alarm condition 30, the controller 14 compares current GPS coordinates with the last previously saved GPS coordinates to determine a magnitude of movement of the vehicle away from a location it was left at when the system 10 was armed by command from an owner/operator of the vehicle. The arm command can be hard wired (a button or keypad with combination to arm/disarm) or by wireless connection (a conventional key fob remote) or by command input made via a valid incoming call 28, as is describe in greater detail hereinafter.

The magnitude of movement may be a variable. If the system is armed and parked in a normal manner, detection of even a small movement (i.e., greater than or equal to 100 feet) can be used to generate the positive alarm condition 30.

However, the system 10 is also intended to include a "valet parking" mode that is selectable by the owner/operator of the vehicle. It is well known that when a vehicle is valet parked, it may be driven by the valet a short distance away from the drop off and pick up location.

A predetermined range of motion, when in valet parking mode, for example, movement up to one mile, would be tolerated without causing any generation of the positive alarm condition 30. However, if the GPS device detected motion of the vehicle that exceeded one mile from the drop off location, a theft would be concluded, and positive alarm condition 30 would result.

Other types of sensors can also be included, for example those that monitor vehicle operation parameters such as speed of the vehicle, acceleration and deceleration values (from a g-force sensor), times of operation, and distance the vehicle is driven away from a reference location (using GPS coordinates). If operation of the vehicle beyond a predetermined operational parameter occurs, the system 10 is adapted to inform the owner even if the system is not in an "armed" condition. That information may be provided in real time, if desired, or more likely when the system 10 is queried by the owner and commanded to download such data.

Notification of the owner is described in greater detail hereinafter. However, it is preferable that any notification the owner receives provide some indication of the cause, for example, that an active alarm condition is in process.

Another example of an optional sensor is obtained by electrical connection to a controlling device used to energize a set of air bags (not shown) that generate a positive alarm condition 30 subsequent to an activation of the air bags. This condition would be indicative of an emergency (i.e., an accident/crash) and it is desirable that the system 10 place a call to 911 to summon help using its cell phone 12 regardless of whether the system 10 is in an armed condition or not.

It is expected that when the vehicle is being normally operated (i.e., driven), the system 10 would be in a "disarmed" state. This state is when an accident is most likely to occur. It is possible, however, that a parked vehicle, with the system 10 in an armed state, may be struck by another vehicle sufficient to activate the air bags. In either event, an emergency 911 call is placed by the system 10. The microprocessor 16 is preprogrammed to respond by placing the emergency 911 call subsequent to a detection of this type of a condition (activation of air bags). Upon answering it may play a message stored in the memory 17 such as "crash, send help" repeatedly, keeping the connection active so that 911 location of the accident can occur.

If a camera (either still photograph or video camera) is available, for example a Bluetooth or other type, a real-time still photograph or real-time video stream would, preferably, be send (transmitted) to 911 as well so as to provide an opportunity for the dispatcher to determine the extent of injuries in the vehicle.

Referring now to FIG. 3, "B", after positive detection of the alarm condition 30 when the vehicle is armed (i.e., an attempted theft), the system 10 attempts to contact 34 the owner. A preferred mode is by placing a call to a preprogrammed personal telephone number and device of the owner using the cell phone 12.

Ideally, the owner has modified his own personal telephone number and device to recognize a caller ID of the cell phone 12 and to behave in a unique manner. Preferably, the personal telephone number and device will display a message rather than the cell phone's 12 phone number. A preferred message is "Auto Alarm Sounding" and preferably, the ringer will also be programmed to produce a unique sound or warble to even better attract attention of the owner. It is desirable that the owner respond immediately to any call the cell phone 12 is placing and not allow the call to go to the voice mailbox of the personal telephone number and device.

Successful contact 36 is verified by the system 10. If the owner does not respond, alternate modes 38 that provide back up contingencies for contacting the owner, including sending the owner an email, or by SMS or MMS, or any other preferred way including placing a plurality of telephone calls by the cell phone 12 to alternate contact telephone numbers is provided by the system 10.

Assuming the owner answers the initial attempt to contact the owner 34, the system 10 listens for key input from the owner while the telephone connection is active to determine what additional data transfer or other function 40 may be desired.

An essential operating element, as is described in greater detail hereinafter, of the system 10 is to establish a three-way conference call (reference numeral 70 FIG. 5) with a 911 dispatcher and to ensure that the call to the 911 dispatcher appears to originate from the cell phone 12. This is important because 911 location ability is based on finding the geographical location of the cell phone that actually places the 911 call.

One possible mode of accomplishing this is for the owner to enter a key sequence from his personal telephone device that the system 10 receives and determines if the other function 40 is required. If a valid function 40 is detected, the system 10 will perform 42 the function 40, whatever it is.

One such function is to instruct the cell phone 12 to place the owner's call on hold, for the cell phone 12 to place a second call to 911, and upon detection of an answer from 911 (end of ringing, hearing a voice, etc.), for the system 10 to add the owner's call to the 911 connection so that the owner can talk directly to a 911 dispatcher and tell him or her that the vehicle is being stolen and please send law enforcement personnel to locate and recover it.

In this manner a three-way conference call is established between the cell phone 12 and the 911 dispatcher and the owner and the 911 dispatcher. Although the cell phone 12 generates the call to 911 and appears as the origin thereof, the cell phone 12 does not "speak" in this mode and therefore appears to be transparent to the 911 dispatcher (other than it placing a cellular 911 call and allowing tracking (i.e., location) of the vehicle by cellular 911 technologies to within 100 feet).

It is important to note that the owner's call does not always have to be put on hold and later added in order to create the three-way conference call. Various cellular technologies, (for example, 2.5 G, 3 G, GSM/GPRS) and others may be adapted to retain the first call (from the owner or otherwise) as an active call (i.e., not on hold) while establishing yet another simultaneous connection. The preferred embodiment is intended to include all such methods as well.

After the system 10 performs 42 any required function, the call to the owner is terminated and the system goes back to the quiescent loop of FIG. 2. The system 10 does not "forget" the nature of the alarm condition 30. This information is retained until receipt of a reset command by the owner is later received by the system 10.

However, there are also other ways to establish a three way conference 911 call, some of which are described herein. Ideally, the owner would first determine if there really is a problem, i.e., an intrusion or attempted theft in process, before instructing the system 10 to establish the three-way 911 conference call.

Figure 4:
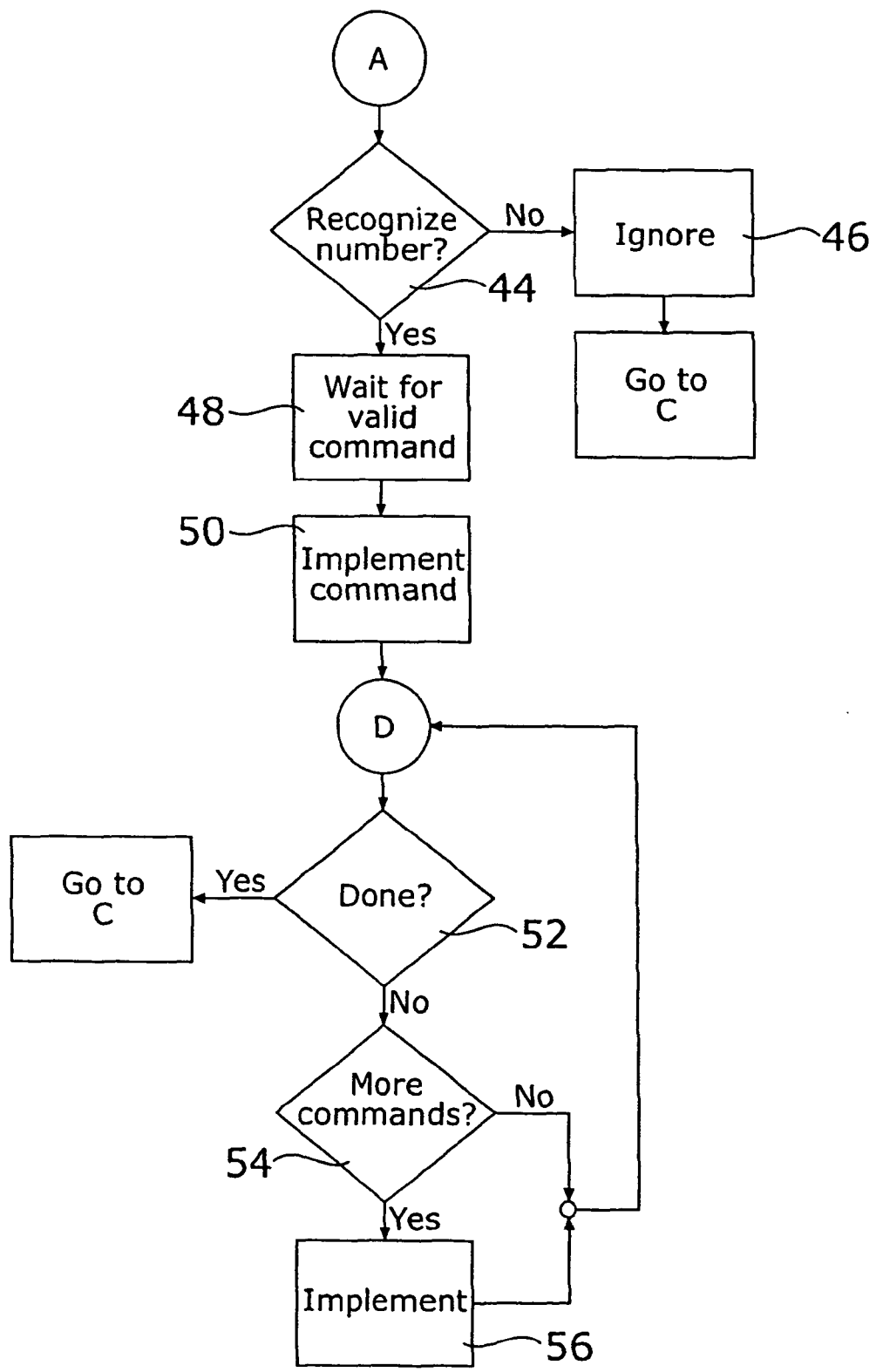
FIG. 4 is a high-level flow chart of the emergency conference calling system of FIG. 1A-1D after detection of an incoming call of FIG. 2.

Referring now to FIG. 4, is shown operation of the system 10 when the cell phone 12 detects receipt of the incoming call 28.

The incoming call 28 may be placed by the police. For example, the owner, after notification of the "Auto Alarm Sounding" by the cell phone 12 may personally confirm the alarm condition 30 and place a personal call to 911. The owner may then ask the 911 dispatcher to call the cell phone 12. This is not expected to occur as the preferred mode, however it is an option. The 911 dispatcher can then input a command code to the system 10 using the cell phone 12, for example, instructing the system to call 911 (so location can be tracked which may not be necessary for certain 911 based cellular systems) using the cell phone 12 or to disable engine operation, or to perform other possible functions, such as also calling the owner and establishing the three-way conference call.

Various modifications to 911 functioning are expected to occur and which will either now or in the future allow utilization of 911 cellular location capabilities regardless of whether the call to 911 originates with the system 10 or if a 911 dispatcher were to place the call to the system 10. Clearly, if location capability of the vehicle is provided when the dispatcher calls the system 10, there is no need for the system 10 to terminate its connection with the dispatcher and then redial 911.

More commonly, the incoming call 28 will be placed by the owner. The owner may wish to input commands and program any of the programmable fields or options of the system. The owner may wish to arm or disarm the system 10 or enter or exit from the valet parking mode.

It is possible that the incoming call may be a wrong number or it may be an unwanted solicitation.

Upon detection of the incoming call 28, the system makes a determination as to whether or not it recognizes 44 the caller ID (i.e., the telephone number of the incoming call 28). The owner's cell phone, home phone, work phone, and other possible numbers will already have been programmed into the system's 10 memory 17 as valid calling ID's that it can recognize as well as the telephone numbers of the police and/or the 911 dispatcher.

Obviously, all valid origins of the incoming call 28 cannot permit caller ID blocking when placing a call to the system 10. If caller ID blocking is in effect, it must be disabled for any call made to the cell phone 12.

If the incoming call 28 is not recognized, the system 10 will ignore it 46 and return to its quiescent state.

If the incoming call 28 is recognized as a valid number, the system will then wait for a valid command entry 48 and it will then implement the command 50, whatever it may be. The command may be an instruction from the owner instructing the system 10 to place a call to 911, shut off the engine, or enter or change a programmed setting, including the addition or deletion of any valid telephone numbers. A possible example of the implementation 50 is described in greater detail hereinafter.

After implementation 50 has been accomplished by the system 10, the system 10 verifies if it is done 52. Certain commands 48 may contain a logical ending whereas other commands 48 may require other input or other command entries to complete a process. When done, the system 10 goes back to its quiescent loop.

If not done 52, any additional commands 54 are accepted and implemented 56 until all command entry is done 52.

One such command may be to transmit to either the owner or to 911 the still photograph or the video stream. This information may be useful during any type of an emergency, including a theft or break-in, as well as after a crash has occurred. The option to transmit this information is preferably preserved regardless of the call sequencing that is utilized by the system 10 and described herein.

Figure 5:
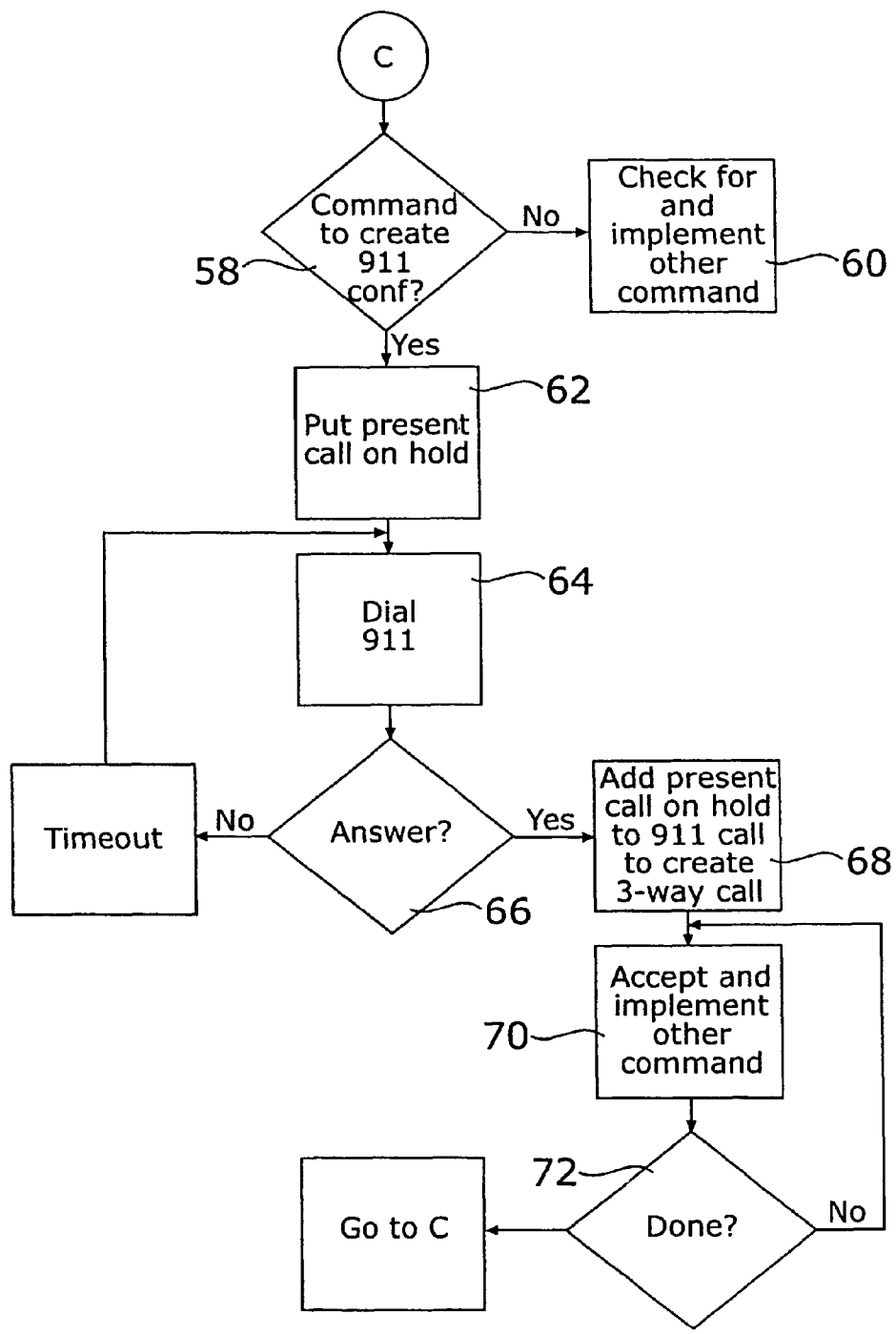
FIG. 5 is a more detailed flow chart of the emergency conference calling system of FIG. 4 showing one possible implementation that is performed in response to a preferred command input.

Referring now to FIG. 5, one example of the command implementation 50 is shown. Assuming the owner placed the incoming call 28 to the system 10 after receipt from the system 10 of the "Auto Alarm Sounding" message from the cell phone 12. Assume also that the owner verified that his or her vehicle is actually missing or that a break-in is in process by, perhaps, looking out a window to view the vehicle.

The system 10 will interrogate the command 48 to determine if it is one of many possible valid commands 48. The example provided in FIG. 5 tests for only one possible valid command 48 input by the owner.

The system 10 determines if the command 48 was an instruction to create a 911 conference call 58. If the answer is no, the system 10 then checks for and implements any and all other possible valid commands 60.

If the command 48 was to create the 911 conference call 58, the system 10 puts the owner (who placed the call and entered the command 48) on hold 62. The system 10 then dials 911 64.

The system 10 then determines if the 911 call is answered 66. If it is not, a timer is allowed to run and after a timeout 68 has elapsed, the sequence is repeated. This is done to provide operation and establish a 911 connection when the system 10 is not in a good cell phone 12 signal strength area. It keeps trying to establish a good 911 connection 64 until it can be obtained.

When the 911 call 64 is answered 66, the system 10 then adds the incoming call 28 that was placed by the owner to the 911 call 64 and creates the desired three-way conference call 70 where the owner can speak directly to the 911 dispatcher.

The owner can inform the dispatcher that the call the dispatcher is receiving is coming from the vehicle, that the owner is not in the vehicle, that the vehicle is vacant (or not, as the case may be), that an alarm condition is active, and add further details, for example, a description of the vehicle.

For example, the owner can tell the dispatcher that a break-in is in process at such and such a location and has been confirmed by the owner's visual observation. The owner can describe the would-be thieves, how many and if they are armed.

The owner could alternatively inform the dispatcher of other information that the owner has received from the system 10 by way of query made to the system 10 by other valid command 48 entries.

For example, the owner could tell the dispatcher that the vehicle is being towed and give the latest available GPS coordinates that the system 10 has provided. The owner could also inform the system 10 to provide updated GPS coordinates, as new ones become available, to the dispatcher to aid in locating the vehicle. Absent GPS data, the 911 location capabilities of the cellular phone system in operation are relied upon to locate the vehicle. The owner could also inform the dispatcher that the system 10 was in the valet parking mode and was moved more than one mile.

While the three-way conference call 70 is active, the system 10 remains able to receive and implement other command entries 72. For example, either the owner or the dispatcher could command the system 10 to download GPS coordinates.

Alternately, the owner or dispatcher could command the system 10 to turn on and transmit a photograph of the vehicle, its contents for example, and transmit that information to the dispatcher or elsewhere.

A command to turn the engine off (if the system 10 confirms it is running) may similarly be received and implemented by the system 10.

In general, the three-way conference call 70 is maintained for as long as it is deemed to be worthwhile. When determination of the need for the conference call 70 is done 72, the system 10 is commanded to hang up and the conference call 70 is terminated.

The system 10 then returns to its quiescent loop. Before normal operation is resumed, the owner will command the system 10 to reset the alarm condition 30.

Only a small potential of the capabilities of the system 10 have been described herein. It is understood that those possessing ordinary skill in the art will benefit from the instant disclosure sufficient to make other changes, improvements, and modifications thereto.

While various modes have been described that permit operation of the system 10, optimum capability is provided only if the system 10 cell phone 12 places a 911 call or receives a call from 911 and if the owner is in simultaneous communication with the 911 dispatcher. To optimally ensure that the dispatcher that receives the 911 call from the cell phone 12 or places a call from 911 to the cell phone 12 is also the "same" dispatcher that the owner is in communication with (as opposed to a dispatcher located away from the original dispatcher), the establishment of the three way conference call 70 is preferred.

The system 10 can operate in three basic modes that allow the owner and 911 dispatcher to be in communication. The preferred mode, as described hereinbefore, is establishment of the three-way conference call 70. A variety of methods of establishing the three-way conference call 70 have been described herein.

An alternate method is that when the system 10 accepts from the owner the command 48 and if the command 48 instructs the system 10 to disconnect the owner's call and then dial 911.

Upon an answer by the 911 dispatcher, the system 10 plays a stored recorded message to the 911 dispatcher that the call is a theft recovery call originating from a cellular telephone (ref. number 12) on the vehicle along with vehicle identification information. The recorded message must also provide the dispatcher with the phone number of the owner that the dispatcher can use to call the owner and to verify the validity of the incoming 911 call from the system 10. This method is known as call transfer. It is, of course, preferable that the 911 dispatcher, while speaking with the owner, maintain the incoming 911 call from the cell phone 12.

The system 10 can also automatically download the phone number of the owner when it places the call to 911. There are two basic ways of accomplishing this. The system 10 can be programmed in advance with a unique phone number to transmit to 911, when commanded to place the call to 911, that the dispatcher can use to call the owner and verify the nature of the automated call that was received.

A preferred method is for the system 10 to log the phone number of the incoming call 28, as long as it was a valid number, and to transmit the ID (i.e., the phone number) of the incoming call 28 to 911. This is useful when any of a variety of phones may be used. For example, the system 10, as mentioned earlier, may be programmed to recognize as valid any of many possible phone numbers.

Let us assume that the owner has a personal cell phone number, an office work phone number, a personal home number, and that the owner has a spouse who also has a similar array of possible phone numbers. If theft of the vehicle were to occur, there is no way to predict which phone number of the many valid numbers in the system's 10 memory of the owner or the spouse might be used to call the system 10 and which phone number should be used by the 911 dispatcher ahead of time. It all would depend on who was using the vehicle and where the vehicle was at the time of theft.

If the system 10 were to automatically forward to 911 the telephone number of the valid incoming call 28, the 911 dispatcher would know exactly what number to call for confirmation of the situation.

A remaining alternative method of using the system 10 is for the owner to place the call to the 911 dispatcher, provide the circumstance and vehicle identification information mentioned above to the 911 dispatcher, and also to provide the cell phone's 12 telephone number. The 911 dispatcher is then able to place a call to the cell phone 12 of the system 10, which has been programmed to recognize and accept the incoming call 28 from 911. This method was described in less detail hereinbefore. This method is also known as "call relay".

Accordingly, the system 10 is adapted to take advantage of call transfer, call relay, and conference call modes of operation in determining the validity of the situation and in screening out false alarms.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A method providing a means whereby a person can initiate establishment of a 3-party conference call connection with 911 through a remotely commanded wireless communications device, comprising:
   a. the person dialing the telephone number of the wireless communications device programmed to auto-answer incoming calls;
   b. the wireless communications device auto-answering the incoming call to establish a call connect;
   c. the person transmitting a command instruction via the established call connection ordering the wireless communications device to execute a predefined dialing sequence predetermined to result in a 3-party conference call being established via conference call services provided by a service provider, said 3-party conference call including the person, the wireless communications device and a 911 call taker, and
   d. said conference call connection allowing the person to tell the 911 call taker the reason for the call and to request emergency services.

2. The method of claim 1 wherein the command transmitted by the person to the wireless communications device ordering the wireless communications device to establish the 3-party conference call connection is a DTMF command.

3. The method of claim 1 wherein image information captured by a camera connected to the wireless communications device is transmitted from the wireless communications device to 911 during the established call connection via image transmission services provided by a service provider.

4. The method of claim 3 wherein the image information transmitted to 911 is formatted in a format selected from the group consisting of a still picture, a sequence of still pictures, JPEG and streaming video.

5. A method providing a means whereby a person can initiate establishment of a 3-party conference call connection with 911 through a remotely commanded wireless communications device, comprising:
   a. the person dialing the telephone number of the wireless communications device programmed to place a return call to the telephone number of the incoming call at termination of the incoming call attempt;
   b. the wireless communications device calling the telephone number of the unanswered incoming call;
   c. the person answering the incoming call from the wireless communications device to establish a call connection and transmitting a command instruction via the established call connection ordering the wireless communications device to execute a predefined dialing sequence predetermined to result in a 3-party conference call being established via conference call services provided by a service provider, said 3-party conference call including the person, the wireless communications device and a 911 call taker, and
   d. the established 3-party conference call connection allowing the person to tell the 911 call taker the reason for the call and to request emergency services.

6. The method of claim 5 wherein the command transmitted by the person to the wireless communications device ordering the wireless communications device to establish the 3-party conference call connection is a DTMF command.

7. The methods of claim 5 wherein image information captured by a camera connected to the wireless communications device is transmitted from the wireless communications device to 911 during the established call connection via image transmission services provided by a service provider.

8. The method of claim 7 wherein the image information transmitted to 911 is formatted in a format selected from the group consisting of a still picture, a sequence of still pictures, JPEG and streaming video.

9. A method providing a means whereby a person can initiate establishment of a 3-party conference call connection with 911 through a remotely commanded wireless communications device, comprising:
   a. reception by the wireless communications device of an incoming command transmission from a remote person, said transmission ordering the wireless communications device to call the telephone number of said person;
   b. the person answering the incoming call from the wireless communications device to establish a call connection;
   c. the person sending a command to the wireless communications device via the established call connection, said command ordering the device to execute a predefined dialing sequence predetermined to establish a 3-party conference call with 911 via conference calling services provided by a service provider, said 3-party call including the person, the wireless communications device, and a 911 call taker, and d. the established 3-party conference call allowing the person to inform the 911 call taker of the reason for the call and to request emergency services.

10. The method of claim 9 wherein the command transmission transmitted from the person to the wireless communications device is selected from the group consisting of text, data, IM, MMS, e-mail and SMS.

11. The method of claim 9 wherein the command transmitted by the person to the wireless communications device ordering the wireless communications device to establish the 3-party conference call connection is a DTMF command.

12. The method of claim 9 wherein image information captured by a camera connected to the wireless communications device is transmitted from the wireless communications device to 911 during the established call connection via image transmission services provided by a service provider.

13. The method of claim 12 wherein the image information transmitted to 911 is formatted in a format selected from the group consisting of a still picture, a sequence of still pictures, JPEG and streaming video.

14. A method comprising:
   a. establishment of a first telephone call connection between the telephone of a person and a wireless communications device, said call initiated by said person;
   b. said call including image information captured by a camera connected to the wireless communications device, said image information transmitted to the telephone of the person during the first call connection via image transmission services provided by a service provider;
   c. the person transmitting a command instruction to the wireless communications device via the established call connection, said command instruction ordering the wireless communications device to execute a predefined dialing sequence predetermined to result in a 3-party conference call being established via conference call services provided by a service provider, said 3-party conference call including the person, the wireless communications device and a 911 call taker, and
   d. said 3-party conference call connection allowing the person to tell the 911 call taker the reason for the call, said 3-party conference call connection including transmission of image information captured by a camera connected to the wireless communications device to 911, said image information transmitted from the wireless communications device to 911 via image transmission services provided by a service provider.

15. The method of claim 14 wherein the command transmitted by the person to the wireless communications device ordering establishment of the 3-party conference call is a DTMF command.

16. The method of claim 14 wherein the image information transmitted to 911 is formatted in a format selected from the group consisting of a still picture, a sequence of still pictures, JPEG and streaming video.

17. A method comprising:
   a. reception by a wireless communications device of a transmission from a remote person, said transmission including a command instruction;
   b. said command instruction ordering the wireless communications device to establish a call connection with 911 and deliver a predefined message;
   c. said call connection allowing 911 to determine the location of the calling wireless communications device using E-911 call location technologies;
   d. said predefined message including a telephone number where the person can be reached,
   e. said telephone number providing 911 with means to call the remote person; verify the need for police assistance and obtain additional information relevant to the emergency services requested.

18. The method of claim 17 wherein image information, captured by a camera connected to the wireless communications device is transmitted to 911 during the call via image transmission services provided by a service provider.

19. The method of claim 18 wherein the image information transmitted to 911 is formatted in a format selected from the group consisting of a still picture, a sequence of still pictures, JPEG and streaming video.

* * * * *